United States Patent
Kitajima et al.

(10) Patent No.: US 9,511,722 B2
(45) Date of Patent: Dec. 6, 2016

(54) INTERIOR PANEL AND INJECTION MOLDING METHOD

(71) Applicant: TOYOTA SHATAI KABUSHIKI KAISHA, Kariya-shi, Aichi (JP)

(72) Inventors: Masanobu Kitajima, Kariya (JP); Junya Usami, Kariya (JP); Takao Murase, Kariya (JP)

(73) Assignee: TOYOTA SHATAI KABUSHIKI KAISHA, Aichi (JP)

( * ) Notice: Subject to any disclaimer, the term of this patent is extended or adjusted under 35 U.S.C. 154(b) by 62 days.

(21) Appl. No.: 14/186,443

(22) Filed: Feb. 21, 2014

(65) Prior Publication Data

US 2014/0252681 A1  Sep. 11, 2014

Related U.S. Application Data

(62) Division of application No. 12/310,050, filed as application No. PCT/JP2007/065799 on Aug. 7, 2007, now Pat. No. 8,846,181.

(30) Foreign Application Priority Data

Aug. 9, 2006  (JP) .................................. 2006-216400

(51) Int. Cl.
   *B29C 45/33*   (2006.01)
   *B60R 13/02*   (2006.01)
   (Continued)

(52) U.S. Cl.
   CPC ............... *B60R 13/02* (2013.01); *B29C 33/44* (2013.01); *B29C 45/33* (2013.01);
   (Continued)

(58) Field of Classification Search
   CPC ................................................ B29C 2045/563
   See application file for complete search history.

(56) References Cited

U.S. PATENT DOCUMENTS 5,573,272 A * 11/1996 Teshima ......................... 280/751
5,656,227 A *  8/1997 Foster .......................... 264/328.1
(Continued)

FOREIGN PATENT DOCUMENTS

| JP | 3-222727 | 10/1991 |
| JP | 6-039555 | 5/1994 |

(Continued)

OTHER PUBLICATIONS

Electronic translation of JP07-329178, two pages.*
(Continued)

*Primary Examiner* — Jill Heitbrink
(74) *Attorney, Agent, or Firm* — Norris McLaughlin & Marcus, P.A.

(57) ABSTRACT

A resin-made interior panel molded into a thin-plate shape using a cavity die and a core die in which portions which corresponds to undercut portions with respect to the die-cutting direction of the molding die includes on the front surface side of a panel a flat bottom portion having a shape which cancels an entire undercut space on the side of the core-die and a rib structure having a plurality of ribs projecting in the shape of plugging back the undercut space and having a plurality of grooves extending from the bottom portion in the die-cut direction. According to the invention as described above, means which maintain the design shape of the interior panel on the front surface side having the undercut portions is provided without necessity of a slide die in the core die.

3 Claims, 5 Drawing Sheets

(51) Int. Cl.
    *B29C 33/44*    (2006.01)
    *B29L 31/30*    (2006.01)
(52) U.S. Cl.
    CPC ... *B60R 13/0256* (2013.01); *B29L 2031/3008* (2013.01); *Y10T 428/24479* (2015.01); *Y10T 428/24612* (2015.01)

(56) References Cited

U.S. PATENT DOCUMENTS

| | | | | |
|---|---|---|---|---|
| 5,709,407 | A | * | 1/1998 | Stephens et al. ............. 280/751 |
| 6,149,853 | A | * | 11/2000 | Luckett et al. ............... 264/266 |
| 6,568,701 | B1 | | 5/2003 | Burdack et al. |
| 2002/0136861 | A1 | * | 9/2002 | Funakoshi .................... 428/119 |
| 2007/0104955 | A1 | * | 5/2007 | Hoogland .................. 428/411.1 |

FOREIGN PATENT DOCUMENTS

| | | |
|---|---|---|
| JP | 7-040372 | 2/1995 |
| JP | 7-329178 | 12/1995 |
| JP | 2001-121613 | 5/2001 |
| JP | 2002-127837 | 5/2002 |
| WO | 2008/018614 * | 2/2008 |

OTHER PUBLICATIONS

Donald V. Rosato, et al.; "Injection Molding Handbook, Second Edition", 1995, Chapman & Hall, New York, XP002610519, pp. 623-626.

Friedrich Johannaber, et al.; "Handbuch Spritzgiessen", Nov. 13, 2001, Hanser, Muenchen, Wien, XP002610520, pp. 1099-1103.

Breitenbach J. "Spritzpraegen und seine Variationen in der Praxis", Plastverabeiter, Huethig GmbH, DE, vol. 19, No. 7, Jan. 1, 1968 (Jan. 1, 1968), pp. 517-524, XP009001827, ISSN: 0032-1338.

Menges G et al. "Spritzgiesen und Spritzpraegen, Vor- und Nachteile", Plastverarbeiter, Huethig GmbH, Heidelberg, DE, vol. 19, No. 11, Jan. 1, 1968 (Jan. 1, 1968), pp. 863-872, XP009001826, ISSN: 0032-1338.

* cited by examiner

INTERIOR PANEL AND INJECTION MOLDING METHOD

REFERENCE TO RELATED APPLICATION

This is a divisional application of Ser. No. 12/310,050, filed May 13, 2009 which is currently pending. The subject matter of the aforementioned prior application is hereby incorporated herein by reference.

TECHNICAL FIELD

The present invention relates to an interior panel and an injection molding method. More specifically, the present invention relates to a thin-plate-shaped interior panel having bent concave-convex shape, which is injection molded using resin, and an injection molding method for such a panel.

BACKGROUND ART

An interior panel injection molded into a thin-plate shape using resin, for example, an instrument panel for a motor vehicle, is formed with openings for disposing a cluster bezel, a grove box, a ventilator grill, and the like. In addition, the concave-convex shape bent intricately is formed for mounting other various parts or devices to be mounted on the back side of the panel. As regards the front surface side of the interior panel, a design property not to expose the concave-convex which is meaningless as a design and does not have a good appearance is required.

The injection molding of the interior panel as described above is normally carried out using a injection molding die including a fixed cavity die having a supply channel for molten resin, and a movable core die opposing thereto. In general, the front surface side of the interior panel is formed by the cavity die and the back surface side thereof is formed by the core die. In the design of the injection molding dies as described above may result in inevitable generation of protruded-shaped portions which interfere in die cutting of the cavity die and the core die caused by the complex bent and concave-convex shape of the panel. The protruded shaped portions as such are referred to an "undercut portion".

As a general countermeasure for molding the undercut portion, integration of a slide die which moves forward and backward along a desired direction, which is different from the die-cutting direction, into a part of the cavity die or the core die is contemplated.

However, the core die essentially requires the usage of a number of the slide dies. It is because molding of other various shaped portions such as pinning portions or screwing portions for connecting components on the back surface side of the panel are necessary in the core die in compensation for securing the design property on the front surface side of the panel. In other words, usage of the slide die for molding the undercut portions in the core die is remarkably limited essentially in design flexibility. Therefore, a technology which is able to solve the problem of molding of the undercut portions without using the slide die on the side of the core die is required.

As a countermeasure for the undercut portions which is conceivable in view of such point of view is to plug back undercut spaces on the side of the core die for the undercut portions of the panel with resin because it does not relate to the design property on the front surface side of the panel. Accordingly, the undercut portions on the side of the core die are eliminated. However, since the plugged-back portion as such is a resin bank, a molding sink as a depression of the resin surface occurs in association with cooling and solidification of the molten resin. When the molding sink occurs, there arises a problem of degradation of the design property on the front surface side of the panel. Since a superficial material at a portion corresponding to the portion of a substrate where the molding sink has occurred is depressed when the superficial material is adhered to the front surface side after having molded a panel body as the substrate, degradation of the design property is also resulted. When bonding an existing foam material layer and the superficial material with each other after having molded the substrate excluding the case of forming the foam material layer by expansion between the substrate and the superficial material, depression occurs in portions of the foam material layer and the superficial material corresponding to the portion of the substrate where the molding sink occurs, so that the degradation of the design property is resulted in the same manner as described above.

A gas injection method is disclosed in Cited Documents 1 and 2 shown below as a technology to prevent occurrence of the molding sink at the resin bank formed in part of the instrument panel or the like although it is different from the processing of the undercut portion. The gas injection method is a technology utilizing a point that the peripheral portion of the resin bank is cooled and solidified earlier, and the solidification of the center portion of the resin bank is delayed. In other words, unsolidified resin at the center portion of the resin bank is discharged by a gas pressure with precise timing when the peripheral portion of the resin bank is cooled and solidified. Accordingly, the resin bank having a hollow structure is made, so that occurrence of the molding sink is prevented as a result.

[Cited Document 1] JP-A-7-40372
[Cited Document 2] JP-UM-A-6-39555

However, when this method is applied to the processing on the undercut portion, it is necessary to mount a device such as a gas injector 37 shown in FIG. 3 in Cited Document 2 newly to, for example, the core die. In addition, it is necessary to form a space for receiving the molten resin discharged by the gas pressure additionally on the surface of the molding die. Therefore, the design flexibility of the injection molding die described above is further impaired.

DISCLOSURE OF INVENTION

A subject of the present invention is to provide means which is capable of solving the problem of undercut portions in the injection molding effectively without changing the surface shape of a portion of the interior panel which corresponds to the undercut portions at the time of injection molding and, in addition, without integrating a slide die for forming the undercut portions in a core die for the injection molding.

The inventor of the present application has conceived a rib structure such as "a plurality of projecting ribs in association with a plurality of grooves extending along the die-cutting direction of the molding die" in the course of studying the solving means of the problem described above. Since the rib structure as such includes the grooves and hence a resin bank does not exist, molding sink does not occur. Since the grooves of the rib structure are formed along the die-cutting direction of the molding die, they do not interfere with the die-cutting of the molding die.

When forming the rib structure described above on the front surface side of the panel, the back surface side of the corresponding portion may be formed into a flat surface with no undercut. Therefore, it is no longer necessary to provide the slide die for processing the undercut portions on the side of the core die. Even when an undercut space on the side of the core die is plugged back, the shape of the undercut potions on the front surface side of the panel is not changed owing to the rib structure formed on the front surface side of the panel. The shape of the undercut portions on the front surface side of the panel may be molded, for example, by integrating the slide die in a cavity die as needed. In order to maintain the design property on the panel surface, it is preferable to cover at least the portion of the rib structure with the superficial material layer. However, the interior panel is expected to be covered with a thin superficial material layer over the entire surface on the front surface side.

The rib structure in the undercut portions of the panel is preferably a rib structure which is formed on the front surface side of the panel (on the side of the cavity die) for plugging back the undercut space on the side of the core die.

(First Invention)

A first invention of the present application is a resin-made interior panel molded into a thin-plate shape using an injection molding die including a pair of dies, the pair of dies including a cavity die for forming a front surface side of a panel and a core die for forming a back surface side of the panel, one of which is a fixed die having a molten resin supply channel structure integrated therein and the other one of which is a movable die opposing thereto, in which portions which corresponds to undercut portions with respect to the die-cutting direction of the molding die in the original shape of the panel includes on the front surface side of the panel a flat bottom portion having a shape which cancels an entire undercut space on the side of the core-die and a rib structure having a plurality of ribs projecting in the shape of plugging back the undercut space and having a plurality of grooves extending from the bottom portion in the die-cut direction.

In the configuration of the first invention, the cavity die for forming the front surface side of the panel is generally the fixed die and the core die for forming the back surface side of the panel is the movable die in many cases. However, the first invention is not limited to the configuration as described above, and includes a case in which the cavity die is the movable die and the core die is the fixed die. The term "plug back" means to eliminate the undercut portions completely and make the undercut portions into the state of a flat surface which does not interfere with the die-cutting.

The meaning of the "a flat bottom portion having a shape which cancels an entire undercut space" and "a plurality of ribs projecting in the shape of plugging back the undercut space" will be described on the basis of FIG. 1(a) and FIG. 1(b). In FIG. 1(a), a panel 3 formed by injection molding with a core die 1 and a cavity die 2 is shown. The panel 3 shows a partial cross-sectional shape having a first portion 50, a second portion 52, and an undercut portion 54. The panel 3 includes undercut portions which interfere with a die-cutting direction X of the core die 1 and a die-cutting direction Y of the cavity die 2 in its original shape. The undercut portions each include an undercut space 4 on the side of the core die 1 and an undercut space 9 on the side of the cavity die 2.

FIG. 1(b) shows a case in which the undercut space 4 on the side of the core die 1 in FIG. 1(a) is eliminated. A rib structure 5 in this case includes a flat bottom portion 6, and a plurality of ribs 7 projecting from the bottom portion 6. Although the ribs 7 are shown as a single rib in the drawing, they are actually formed with a plurality of grooves 8 extending in the die-cutting directions (X, Y) and a plurality of those are overlapped with each other in the depth direction of the drawing. The bottom portion 6 is a flat bottom plate portion having a shape of cancelling the entire undercut space 4, and the individual ribs 7 project from the bottom portion 6 into the shape of plugging back the undercut space 4.

According to the first invention, the undercut portions on the side of the core die are eliminated by the rib structure without changing the shape of the undercut potions on the front surface side of the panel. In other words, since the bottom portion in the rib structure is a flat shape which cancels the entire undercut space, it does not interfere with die-cutting of the core die. Therefore, the necessity of a slide die on the side of the core die for forming the undercut portions may be eliminated. The rib structure provided on the panel surface side forms the undercut portions for the cavity die. However, for example, as shown in an example described later, by integrating the adequate slide die for molding the undercut portions in the cavity die, this interference is avoided. Since the rib structure includes the bottom portion which constitutes part of the thin-plate-shaped panel and the plurality of ribs projecting from the bottom portion having the plurality of grooves, a molding sink does not occur unlike the resin bank.

(Second Invention)

In a second invention of the present application, part of the surface including at least the rib structure or the entire panel surface on the surface of the interior panel according to the first invention described above is covered with a superficial material layer.

In the configuration of the second invention, the term "superficial material layer" may be formed of a single layer of thin superficial material and may be formed of a superficial material having an intermediate layer formed of a foam material or other adequate materials laminated on the back surface thereof. Preferably, the rib structure is formed so as not to generate a step with respect to the non-undercut portions therearound. However, a case in which part or the entire portion of the peripheral portion of the rib structure has a form which generates the step with respect to the non-undercut portions therearound.

As the second invention, at least the rib structure is preferably or required to be covered with the superficial material layer from the problem of the design property on the front surface side of the panel. In the case in which the interior panel is formed by so-called "negative vacuum molding", normally, the entire surface of the panel on the front surface side is originally expected to be covered with the thin superficial material layer.

(Third Invention)

A third invention of the present application is designed to make the rib structure according to the second invention satisfy (1) and (2) shown below;

(1) the width of the grooves is an extent which does not cause generation of depressions on the superficial material layer covering thereon.

(2) the width of the top portion of the rib is an extent which ensures the bonding strength required for the superficial material layer covering thereon.

As the second invention described above, there is a case where part or the entire portion of the panel surface including the rib structure is covered with the superficial material layer. In this case, if the width of the grooves in the rib structure is excessively wide, there is a risk of generation of depression on the superficial material layer, and if the width of the top portions of the ribs is too narrow, there is a risk of falling short of the bonding strength of the superficial material layer. Therefore, the consideration in the design of the rib structure as in the third invention is preferable. However, since the optimal width of the grooves and the width of the top portions of the ribs actually differ depending on the factors such as the material type, the layer structure, and the thickness of the superficial material layer, it is difficult to define the optimal width thereof uniformly by the numerical value.

(Fourth Invention)

In a fourth invention of the present application, the each rib in the rib structure according to anyone of the first invention to the third invention has a shape integrally connected by a connecting portion at a portion corresponding to a central portion or a top end portion thereof.

According to the fourth invention, the strength of the rib structure is improved by the connecting portions. When the rib structure is covered with the superficial material layer, the depression of the superficial material layer due to the grooves of the rib structure is prevented further effectively by the existence of the connecting portions. In addition, further improvement of the bonding strength of the superficial material layer with respect to the rib structure is achieved.

(Fifth Invention)

In a fifth invention of the present application, the interior panel according to any one of the first invention to the fourth invention corresponds to anyone of (3) to (5) shown below:

(3) a laminated structure having the thin superficial material layer bonded to the thin-plate-shaped panel as a substrate layer;

(4) the laminated structure having an intermediate layer formed of foam material or other materials and the thin superficial material layer bonded to the thin-plate-shaped panel as the substrate layer; and (5) an instrument panel for a motor vehicle or an interior panel for other vehicles.

Although the application or the layer structure of the interior panel is not limited, the interior panels as in (3) to (5) in the fifth invention are preferably exemplified.

(Sixth Invention)

A sixth invention of the present application is a method of molding the interior panel according to any one of the first invention to the fifth invention, the method is an injection molding method including injecting and filling molten resin in a state in which the distance between a cavity die and a core die each having a configuration required for molding the interior panel is slightly increased, bringing the core die toward the cavity die, and filling the molten resin entirely in the interior of the cavity.

In the injection molding of the interior panel, only the injection pressure of the molten resin might not be sufficient for filling the molten resin completely in the rib structure which is normally a fine structure. According to the sixth invention, since a drive pressure of the core die which is much larger than the injection pressure of the molten resin is utilized, the molten resin is easily filled completely in the rib structure.

BRIEF DESCRIPTION OF THE DRAWINGS

FIG. 6 is a cross-sectional view showing detailed portions of the rib structure.

BEST MODES FOR CARRYING OUT THE INVENTION

Figure 1A:
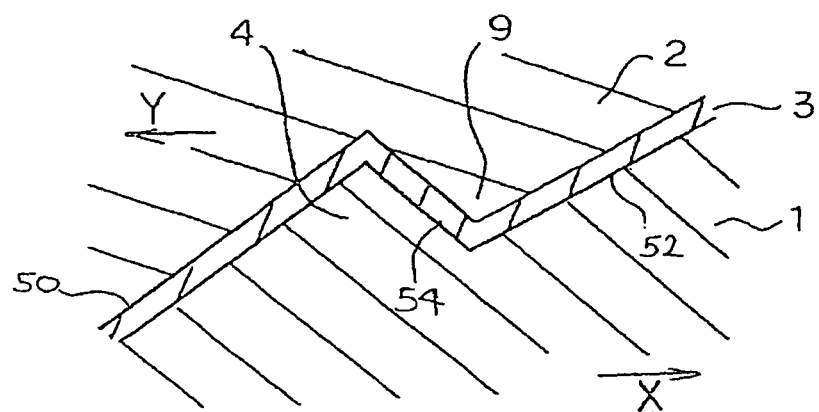
FIG. 1A and FIG. 1B are cross-section views showing a problem of a processing of an undercut portion.
Figure 1B:
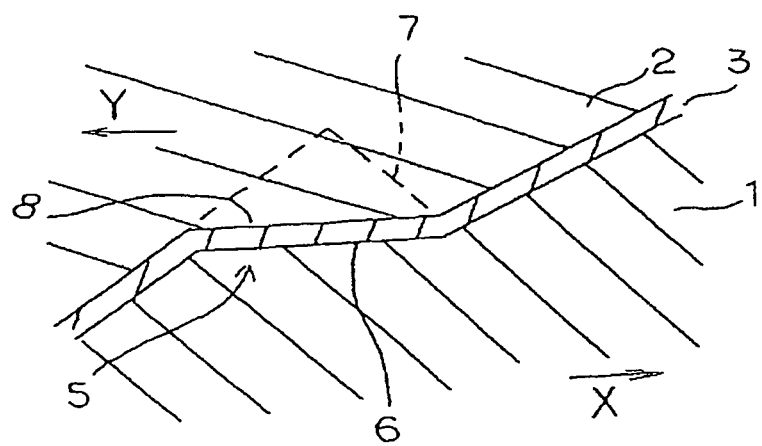

Embodiments of the first invention to the sixth invention including a best mode of the embodiment will be described below.

[Interior Panel]

The interior panel in the present invention is a resin-made panel formed by injection molding into a thin-plate shape using a cavity die for forming the front surface side of the panel and a core die for forming the back surface side of the panel. Normally, the cavity die is a fixed die having a molten resin supply channel structure integrated therein and the core die is a movable die opposing thereto. However, they may be vice-versa.

The interior panel of the present invention is expected to have undercut portions with respect to the die-cutting direction of the molding die in its original shape.

As the interior panel, there are those formed of an injection-molded single-layer thin-plate-shaped resin, or those including an injection molded single-layer thin-plate-shaped resin panel as a substrate layer and a superficial material layer bonded to and covering the front surface side thereof. In the case where a rib structure is formed on the front surface side of the injection molded resin panel, the superficial material layer may be bonded to and cover only a part of the surface on the front surface side including at least the rib structure.

As the superficial material layer as described above, a superficial material layer formed of a thin single-layered superficial material formed of thermoplastic resin and a superficial material layer having a laminated structure including an intermediate material in contact with the substrate layer (for example foam material) and a thin superficial material in contact to the intermediate material are exemplified. After having molded the resin panel as the substrate layer, the superficial material layer may be bonded thereto in normal methods or bonded thereto by a negative pressure molding method. The negative pressure molding method is a method having a process to vacuum-mold the superficial material layer and, simultaneously, to pressure-mold the same onto the substrate layer.

In order to include a foam material layer between the superficial material layer and the substrate layer, there is a case where a formed material is expanded and filled in a space between the substrate layer and the superficial material positioned in an expansion molding die. In this case, the effect to prevent occurrence of molding sink owing to the formation of the rib structure is cancelled as a result.

Although the type and the application of the interior panel are not limited, an instrument panel for a motor vehicle and an interior panel for other vehicles are preferably exemplified. The instrument panel for a motor vehicle having the superficial material layer bonded to or covering the entire surface on the front surface side (cabin side) of the panel is preferable and, specifically, the one having the superficial material layer of the laminated structure including the foam material in contact with the substrate layer and a thin superficial material in contact thereto is preferable.

The interior panel in the present invention is molded using the cavity die and the core die as described above, and the both dies may be opposed in the vertical direction or may be opposed in the horizontal direction.

When injection molding the interior panel, a normal method of keeping the distance between the cavity die and the core die at its original clearance and injecting molten resin may be employed. On the other hand, a method of injecting and filling the molten resin in a state in which the distance between the both dies is slightly increased from its original clearance, then bringing the core die toward the cavity die, and then filling the molten resin entirely in the interior of the cavity may be preferably used in terms of the accuracy of molding.

[Rib Structure]

The rib structure for eliminating the undercut portions formed on the interior panel may be three types as shown below. In the present invention, the rib in (a) is employed for remaining the design shape on the side of the cavity die.

(a) Ribs for eliminating the undercut portions on the side of the core die.

(b) Ribs for eliminating the undercut portions on the side of the cavity die.

(c) Ribs for eliminating the undercuts on both the side of the core die/the side of the cavity die.

From the viewpoint of the portion where the rib structure is formed, it may be classified into two cases as shown below and, in the present invention, the rib structure is formed on the front surface side of the panel in order to eliminate the necessity of the slide die on the side of the core die.

(d) A case where the rib structure is formed on the front surface side of the panel (e) A case where the rib structure is formed on the back surface side of the panel.

The object of forming the rib structure is to prevent molding sink considering the design property of the interior panel. Therefore, in the case (d), it is generally preferable to cover at least the rib structure with the superficial material layer, or to cover the entire portion on the front surface side of the panel with the superficial material layer.

When the embodiment in "(a) and (d)" are employed, the design shape on the front surface side of the interior panel is maintained, and at least the necessity of the slide die for forming the undercut portions on the side of the core die is eliminated. The rib structure formed on the side of the front surface side of the interior panel is preferably hidden by the coating or the like with the superficial material layer.

[Design of the Rib Structure]

According to the rib structure formed on the front surface side of the interior panel, as described above, part of the front surface including the rib structure or the entire front surface of the panel is preferably covered with the superficial material layer in view of consideration of the design property.

When the superficial material layer covering the rib structure is depressed at portions of the grooves of the rib structure, the design property is impaired. Also, when the top portions of the ribs in the rib structure do not have a sufficient bonding strength with respect to the superficial material layer, portions of the superficial material layer corresponding thereto may be separated and lifted. Therefore, the width of the groove of the rib structure is preferably an extent which does not generate depressions on the superficial material layer covering thereon, and the width of the top portion of the rib is preferably an extent which ensures the bonding strength required for the superficial material layer covering thereon.

A preferable design of the rib structure which effectively copes with these problems differs depending on various factors, and it is difficult to define uniformly. As the various factures, for example, the thickness of the superficial material layer is exemplified. The layer structure of the superficial material layer such that the superficial material layer only includes a thin superficial material or includes the superficial material with the intermediate material such as the formed material is also exemplified. The method of bonding the superficial material layer such as direct bonding by contact bonding or the like or bonding via the bonding agent is also exemplified.

However, when venturing to give an example of preferred design, the distance between the ribs in the rib structure may be 3 mm or smaller, and the height of the ribs from the bottom portion may be about 3 to 20 mm. Considering the die-cutting of the rib structure, the cross-sectional shape of the individual rib in the thickness direction may be a trapezoidal shape having several degrees of draft angle.

The rib structure is preferably configured in such a manner that the each rib has a shape integrally connected by a connecting portion at a portion corresponding to the central portion or the top end portion thereof. The connecting portion is expected to provide effects to reinforce the rib structure, prevent the depression of the superficial material layer in the groove portions by a supporting effect with respect to the superficial material layer, and reinforce the bonding effect of the superficial material layer in the rib structure.

EXAMPLE

Referring now to FIG. 2 to FIG. 6, an example of the present invention will be described. The technical range of the present invention is not limited by the following example.

Figure 2A:
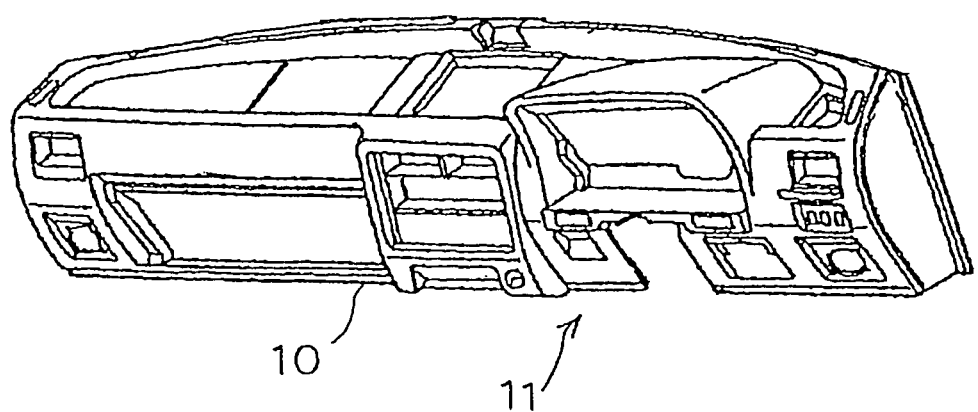
FIG. 2A and FIG. 2B are perspective views of a front surface side and a back surface side, respectively, of an instrument panel for a motor vehicle.
Figure 2B:
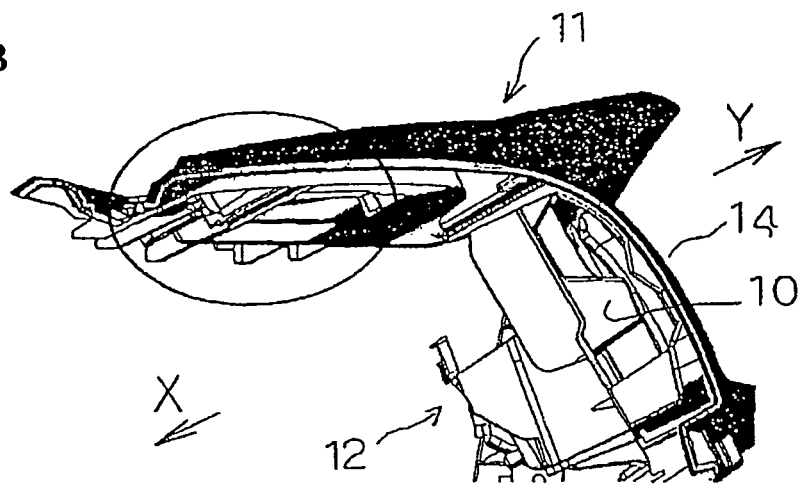

FIG. 2(a) is a front view of an instrument panel in the related art, which has the same shape as the instrument panel for a motor vehicle according to this example, and FIG. 2(b) is a perspective view viewed from obliquely back side thereof. The instrument panel is injection molded by forming a front surface side 11 of a panel body 10 by a cavity die, not shown, and forming a back surface side 12 by a core die, not shown. Thereafter, a foam material layer 13 and a superficial material layer 14, described later in conjunction with FIG. 4(b), are laminated on the front surface side 11 of the panel body 10. The core die is designed to be die-cut in the arrow X direction in the drawing, and the cavity die is designed to be die-cut in the arrow Y direction in the drawing in the injection molding described above.

In the panel body 10 as such, the undercut portions which are protruded so as to interfere with the die-cutting of the core die and the cavity die are generated at least at about ten spots even though the die design is considerably devised. For example, a portion surrounded by an oval line in FIG. 2(b) is an opening for a defroster of the instrument panel, and the undercut portions are present in this portion as well. In the instrument panel in the related art, the undercut portions are molded normally by using the slide die.

Figure 3:
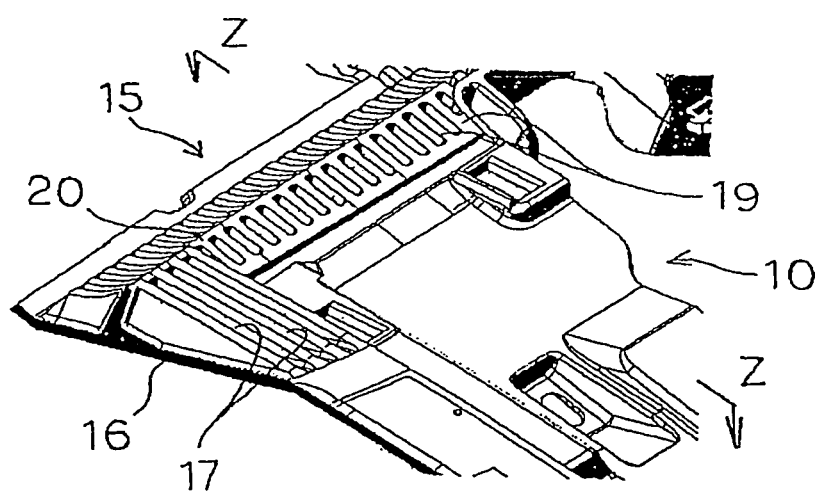
FIG. 3 is a perspective view of a rib structure according to an embodiment.
Figure 4A:
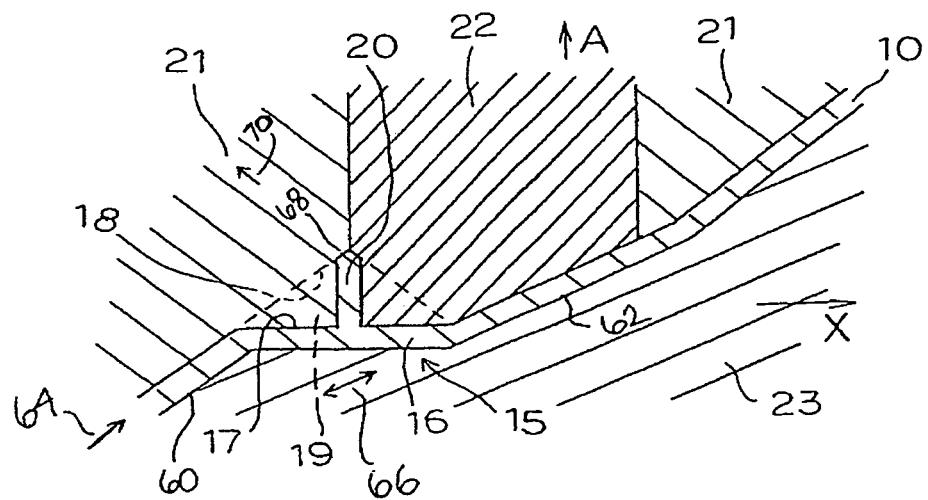
FIG. 4A is a drawing showing a principal portion of a cross-section taken along the line Z-Z in FIG. 3 together with the cross-section of an injection molding die.
Figure 4B:
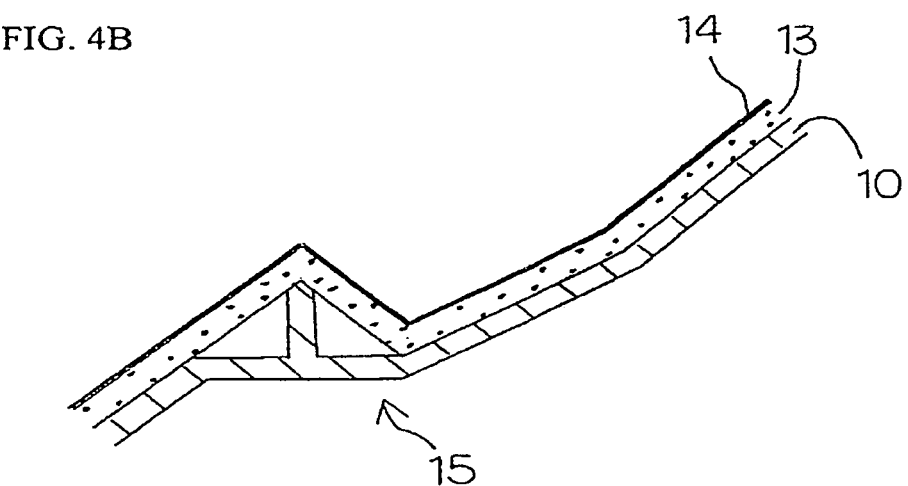
FIG. 4B is a drawing showing a cross-section of a panel including a foam material layer and a superficial material layer laminated and bonded to each other.

In this embodiment, a rib structure portion 15 shown in FIG. 3 and FIG. 4 is provided in this portion of the panel body 10. FIG. 3 is a perspective view of the panel body 10 viewed from the front surface side, and FIG. 4 is drawings showing a principal portion of a cross-section taken along the lien Z-Z in FIG. 3. The line Z-Z in FIG. 3 is a line which passes through the portion where a groove 17 is formed. In FIG. 4(a), an injection molding die is also shown and, in FIG. 4(b), a state in which a foam material layer and a superficial material layer are laminated and bonded to the panel body after molding is shown.

The rib structure portion 15 (e.g., an adapted portion) includes a flat bottom portion 16 (e.g., shown as a straight length portion) having a shape which cancels an entire portion (e.g., see undercut portion 54 of FIG. 1A) which corresponds to the undercut portions (e.g. see undercut areas 4, 9 of FIG. 1A) on a core die 23 side, and a plurality of ribs 19 projecting in the shape of plugging back an undercut space 18 and having the plurality of grooves 17 extending from the bottom portion 16 along a die-cutting direction X of the core die 23. The flat bottom portion 16 is shown as extending from an end of a first portion 60 (e.g., compare to first portion 50 of FIG. 1A) to an end of a second portion 62 (e.g., compare to second portion 52 of FIG. 1A). The first portion 60 is shown to extend in a first direction 64 toward a distal end 68 of the rib 19. The second portion 62 extends in a second direction 66. The distal end 68 is located in a third direction 70 relative an end of the second portion 62, where the second portion 62 meets the flat bottom portion 16.

Since the bottom portion 16 has a shape which cancels the entire portion which corresponds to the undercut portions on the side of the core die, it does not interfere with the die-cutting direction X of the core die as shown in FIG. 4. Therefore, the undercut portions on the side of the core die are eliminated, and the slide die for molding the undercut portions is not necessary. With the plurality of ribs 19 in the rib structure portion 15, the design shape on the front surface side of the panel body 10 in the undercut portions is maintained. In addition, since the rib structure portion 15 includes the plurality of ribs 19 having the grooves 17, molding sink of the resin does not occur in this portion.

In the rib structure portion 15, the center portion of the individual rib 19 is connected integrally by a connecting portion 20. The connecting portion 20 improves the structural strength of the entire rib structure portion 15 and maintains the design shape on the front surface side of the panel body 10 further reliably. Since the undercut portions of the rib structure portion 15 are present on the front surface side of the panel body 10, as shown in FIG. 4(a), it is necessary to use a cavity die 21, and a slide die 22 integrated in the cavity die 21 for molding the undercut portions on the front surface side of the panel body 10. The slide die 22 is slidable in the arrow A direction in FIG. 4(a) prior to the die-cutting of the cavity die 21.

As the shape of the individual rib 19 in the rib structure portion 15, for example, a trapezoidal shape in cross section as shown in FIG. 6 is preferable for the die-cutting. As an example of the design, the mutual distance between the base portions of the ribs 19 is 1.5 mm, and the width of the top portion of the ribs 19 is 3 mm, and the mutual distance between the top portions of the ribs 19 is 3 mm at the maximum. The inclination of side wall portions (draft angle) of the rib 19 having the trapezoidal shape in cross section is, for example, about 2° to 3°.

Since the rib structure portion 15 has the connecting portions 20, it is necessary to mold the left and right halves of the rib structure portion 15 in FIG. 4 by the cavity die 21 and the slide die 22 respectively from the problem of the die-cutting of the cavity die 21. In other words, as shown in FIG. 5(a), it is necessary to set the boundary between the cavity die 21 and the slide die 22 to a portion along the centerline of the connecting portion 20, form a die face for molding a left side portion 19a of the ribs 19 in the cavity die 21, and form a die face for molding a right side portion 19b of the ribs 19 in the slide die 22.

Figure 5A:
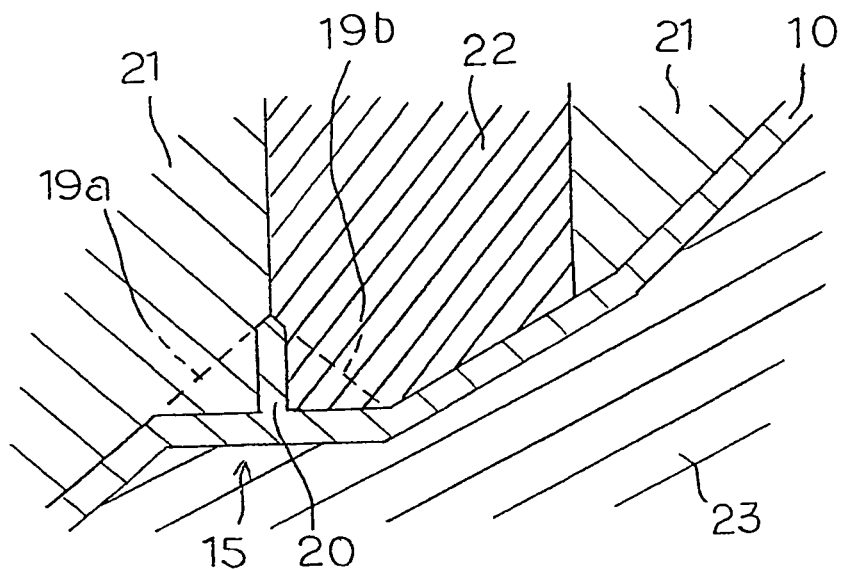
FIG. 5A and FIG. 5B are drawings showing two types of examples of molding of the rib structure by the injection molding die.
Figure 5B:
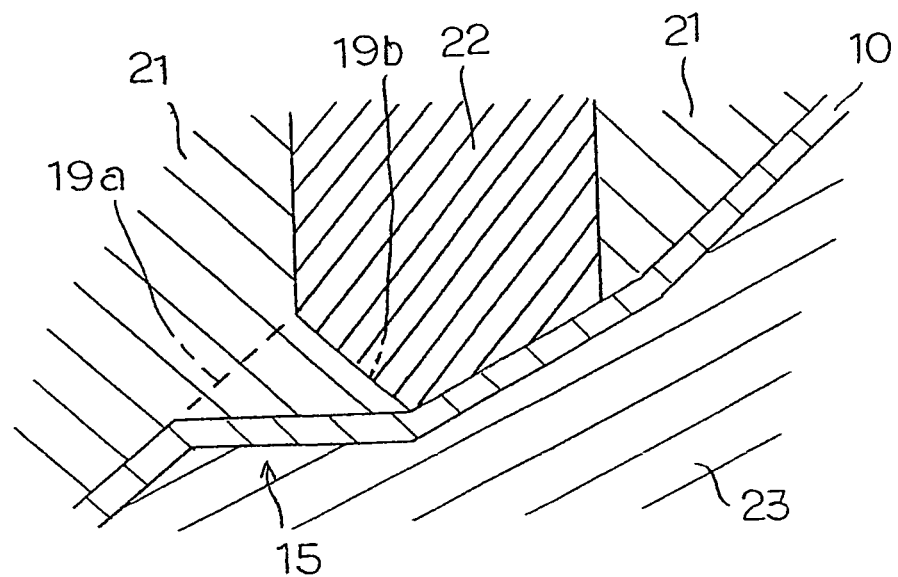

When the rib structure portion 15 is not provided with the connecting portion 20, a method of forming the rib structure shown in FIG. 5(a) is also possible. However, as shown in FIG. 5(b), the cavity die 21 can be die-cut without problem also by molding the entire portions of the left side portions 19a and the right side portions 19b of the ribs 19 by the cavity die 21.

In this embodiment, as shown in FIG. 4(b), the foam material layer 13 and the superficial material layer 14 are laminated and bonded after having molded the panel body 10.

INDUSTRIAL APPLICABILITY

According to the present invention, when injection molding the interior panel having the undercut portions, means which does not need the usage of the slide die in the core die while maintaining the design shape on the front surface side is provided.

What is claimed is:

1. An injection molding die for molding a resin-made interior panel molded into a thin-plate shape, said injection molding die including a pair of dies, the pair of dies comprising:
   a cavity die adapted for forming a front surface side of a panel comprising the resin-made interior panel molded into a thin-plate shape, and
   a core die adapted for forming a back surface side of the panel, one of the dies being a fixed die having a molten resin supply channel structure integrated therein and the other of the dies being a movable die opposing the fixed die, the core die being adapted to avoid an undercut between a first portion of the panel extending along a first direction and a second portion of the panel extending along a second direction by forming an adapted portion of the panel between said first portion and said second portion;
   wherein in a cross section through the first portion, second portion, and adapted portion, the first portion extends in the first direction to meet the adapted portion, the adapted portion extends in a third direction to meet the second portion, and the second portion extends in the second direction from the adapted portion, so that said adapted portion extends within said cross section at an angle to said first direction and said second direction;
   wherein said core die is adapted to form said adapted portion that serves to avoid occurrence of said undercut so that said adapted portion includes a straight length portion extending from said first portion to said second portion within said cross section, and a rib portion extending within said cross section from said straight length portion; and
   wherein said dies are further adapted to form said rib portion to a height by which a distal tip of the rib portion within said cross section lies between said first portion and said second portion on a line, within said cross section, extending in said first direction from said first portion; and
   wherein the adapted portion occupies an area within said cross section bounded by:

a first straight line being said straight length portion;

second straight line extending in said first direction to said distal tip from a first end point of said straight length portion at a junction of said straight length portion and said first portion; and a third straight line extending from said distal tip to a second end point of said straight length portion at a junction of said straight length portion and said second portion; and wherein said area serves in place of the undercut.

2. An injection molding method for molding a resin-made interior panel into a thin-plate shape comprising injecting the resin into an injection molding die of claim 1 so as to define said thin-plate shape.

3. The injection molding method according to claim 2, further comprising:

injecting and filling the resin comprising a molten resin as a distance between the cavity die and the core die is increased, moving the core die toward the cavity die; and filling the molten resin entirely within the interior of the cavity die.

\* \* \* \* \*